United States Patent [19]

Kawada

[11] Patent Number: 4,909,357

[45] Date of Patent: Mar. 20, 1990

[54] SAFETY DEVICE FOR A JACKING SYSTEM INCLUDING A PLURALITY OF JACKS DESIGNED FOR SIMULTANEOUS OPERATION

[75] Inventor: Hiroyuki Kawada, Hekinan, Japan

[73] Assignee: Sugiyasu Industries, Co., Ltd., Aichi, Japan

[21] Appl. No.: 154,085

[22] Filed: Feb. 9, 1988

[30] Foreign Application Priority Data

Feb. 10, 1987 [JP] Japan ............................ 62-18151[U]

[51] Int. Cl.[4] .............................................. B60S 13/00

[52] U.S. Cl. .................................... 187/8.5; 187/8.72; 187/18; 254/122

[58] Field of Search ....................... 187/8.71, 8.72, 18, 187/8.41, 28, 8.5; 182/69, 157, 2, 141; 254/122, 89 R, 89 H; 91/508, 511

[56] References Cited

U.S. PATENT DOCUMENTS 3,796,282 3/1974 Denile et al. ........................ 182/141

4,724,930 2/1988 VanLierop ......................... 187/8.71

*Primary Examiner*—Kevin P. Shaver

*Assistant Examiner*—Kenneth Noland

*Attorney, Agent, or Firm*—Lahive & Cockfield

[57] ABSTRACT

A safety device for a jacking system comprising a plurality of jacks which are designed for simultaneous operation, at least one table supported on the jacks, and a mechanism connecting the jacks for their simultaneous operation. Each jack is provided with a hydraulic or pneumatic cylinder for moving the jack to raise and lower the table, a pawl and rack mechanism which is normally held in its engaged position for holding the table in its raised position, and an AC solenoid connected to the pawl and rack mechanism for moving it to its disengaged position to allow the table to be lowered. The device includes a resistor connected in series to the solenoid. An integrating circuit is connected in parallel to the resistor, includes a capacitor and produces an electrical signal indicating any failure of the pawl and rack mechanism to be moved to its disengaged position. A relay is connected in parallel to the capacitor for operation in response to the signal to stop any lowering motion of the cylinder.

11 Claims, 4 Drawing Sheets

SAFETY DEVICE FOR A JACKING SYSTEM INCLUDING A PLURALITY OF JACKS DESIGNED FOR SIMULTANEOUS OPERATION

BACKGROUND OF THE INVENTION

1. Field of the Invention:

This invention relates to a safety device for a jacking system including a plurality of jacks which are designed for simultaneous operation. More particularly, it is a device which ensures the simultaneous operation of the jacks when a cargo table or tables are lowered.

2. Description of the Prior Art:

There is known a jacking system including a plurality of jacks which are designed for simultaneous operation. It is a system which is used, for example, for a cargo handling job, or for lifting a motor vehicle when repairing it. A typical system of this category comprises a pair of jacks which are connected to each other by a mechanism for raising and lowering the two jacks simultaneously. It also includes a horizontal table or tables supported on the jacks for carrying a cargo thereon. Each jack is provided with a pawl and rack mechanism for holding the table in a raised position. A typical pawl and rack mechanism comprises a pair of racks and a pair of pawls each of which is normally held in engagement with one of the racks for holding the table in its raised position, but is disengageable therefrom for allowing the table to be lowered.

A serious problem can, however, occur if the pawls in either of the jacks are not properly disengaged from the racks when an attempt is made to lower the table or tables. One of the jacks stays in its raised position, while the other jack is lowered. As a result, the table is inclined, or the tables are positioned at different levels of height. This results in the inclination, displacement or dropping of the cargo on or off the table or tables. There is every likelihood that the cargo may cause a safety hazard to the jack operator.

Various types of safety devices are, therefore, known. They include a device which detects the position of the table or tables and transmits a signal for actuating a mechanism for lowering the table or tables only when the table is not inclined, or when the tables stay at the same level of height. This device is, however, highly complicated or sophisticated. It is expensive and adds considerably to the cost of the jacking system as a whole.

Another known device includes a limit switch which functions to operate a mechanism for lowering the table or tables only when the pawls are all disengaged from the racks. This device, however, lacks reliability in operation, as the terminals of the limit switch often fail to make proper contact, or as a limit switch actuator often fails to work properly.

SUMMARY OF THE INVENTION

Under these circumstances, it is an object of this invention to provide an improved safety device which is simple in construction and yet can reliably prevent any one-side lowering motion of a jacking system resulting from the malfunction of a pawl and rack mechanism in any of jacks in the system.

This invention is an improvement in the safety device for a jacking system comprising a plurality of jacks which are designed for simultaneous operation, a cargo table or tables supported on the jacks, and a mechanism connecting the jacks for their simultaneous operation, each jack being provided with a fluid pressure-operated cylinder for moving the jack to raise and lower the table, a pawl and rack mechanism which is normally held in its engaged position for holding the table in its raised position, and an AC solenoid connected to the pawl and rack mechanism for moving it to its disengaged position to allow the table to be lowered.

The improved device comprises a resistor connected in series to the AC solenoid, an integrating circuit connected in parallel to the resistor and including a capacitor, and a relay connected in parallel to the capacitor.

If the pawl and rack mechanism in any of the jacks fails to be properly brought to its disengaged position, any such failure is electrically detected and in response to an electrical signal indicating any such failure, the relay is actuated to stop the lowering motion of the cylinder. The principle of the device according to this invention is based on the fact that there is a remarkable difference in the amount of an electric current flowing to the AC solenoid between when the pawl and rack mechanism is in its disengaged position and when it is not.

The device of this invention ensures that all of the cylinders be operated only simultaneously to lower the table or tables only when the pawl and rack mechanisms in all of the jacks are in their disengaged position, and that the table or tables always maintain their horizontal position when lowered, so that there may not occur any inclination, displacement or dropping of the cargo that is likely to cause a safety hazard to the operator, or damage to the cargo.

The device of this invention employs an electrical circuit, instead of a mechanical device, for determining whether the pawl and rack mechanism is in its disengaged position. Therefore, it is reliable in operation, simple in construction, and inexpensive to manufacture.

Other features and advantages of this invention will be apparent from the following description and the accompanying drawings.

DETAILED DESCRIPTION OF THE INVENTION

Figure 1:
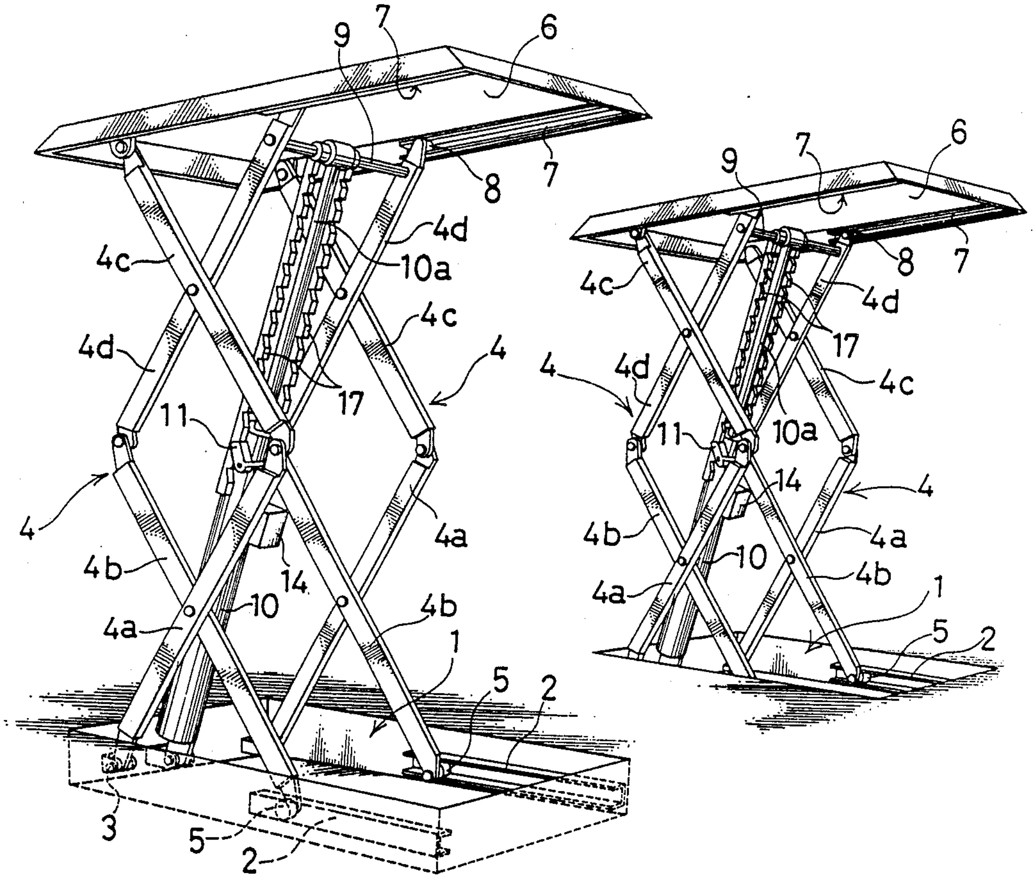
FIG. 1 is a perspective view of a vehicle lifting system including a device embodying this invention.

A jacking system to which this invention is applicable is shown by way of example in FIG. 1. It is a system which is used for lifting a motor vehicle when repairing it. It comprises a pair of jacks which are mounted in a pair of rectangular pits 1, respectively, made in a floor. A pair of channel-shaped rails 2 are provided on two sidewalls, respectively, of each pit 1 and extend from one end of the pit 1 to its middle portion. The open sides of the rails 2 face each other. A pair of coaxial shafts 3 are provided at the other end of each pit 1. Each jack is of the type which is known as a scissors jack. It comprises a pair of double X-shaped jack components 4 disposed vertically in parallel to each other. Each jack component 4 comprises a first link 4*a* and a second link 4*b* which are rotatably joined to each other at their mid-portions and form an X-shaped structure, and a third link 4*c* and a fourth link 4*d* which are also rotatably joined to each other at their mid-portions and form an X-shaped structure. The lower ends of the third and fourth links 4*c* and 4*d* are rotatably connected to the upper ends of the first and second links 4*a* and 4*b*, respectively, whereby a double X-shaped structure is formed. The first link 4*a* in each jack component 4 has a lower end supported rotatably on one of the shafts 3. The second link 4*b* has a lower end provided with a roller 5 fitted in one of the rails 2. The lower end of the second link 4*b* is, therefore, slidable along the rail 2 toward and away from the lower end of the first link 4*a* to thereby cause the jack component 4 to expand and contract.

A table 6, which is used for carrying thereon the motor vehicle to be repaired, is horizontally supported on the upper ends of the jack components 4. The upper ends of the third links 4*c* are rotatably supported on the underside of the table 6 at one end thereof. The table 6 is provided on the underside thereof with a pair of transversely spaced apart rails 7 of the channel-shaped construction extending from the other end of the table 6 to its middle portion. Each fourth link 4*d* is provided at the upper end thereof with a roller 8 fitted in one of the rails 7. A connecting rod 9 extends horizontally between the two fourth links 4*d* slightly below the upper ends thereof and connects them and thereby the two jack components 4 together.

A hydraulic cylinder 10 is provided for raising and lowering the table 6. It has a lower end supported rotatably on the end wall of the pit 1 between the lower ends of the first links 4*a* and includes a piston rod 10*a* having an upper end supported rotatably on the connecting rod 9 in its middle portion. It is alternatively possible to use a pneumatic cylinder for raising and lowering the table 6.

A pair of transversely spaced apart pawls 11 are rotatably supported on the cylinder 10 adjacent to the upper end thereof and are connected to each other by a connecting member 12. A pair of transversely spaced apart racks 17 are provided on the opposite sides, respectively, of the cylinder 10 in parallel thereto. Each rack 17 has a plurality of downwardly facing teeth. The pawls 11 and the racks 17 define a pawl and rack mechanism.

Figure 2:
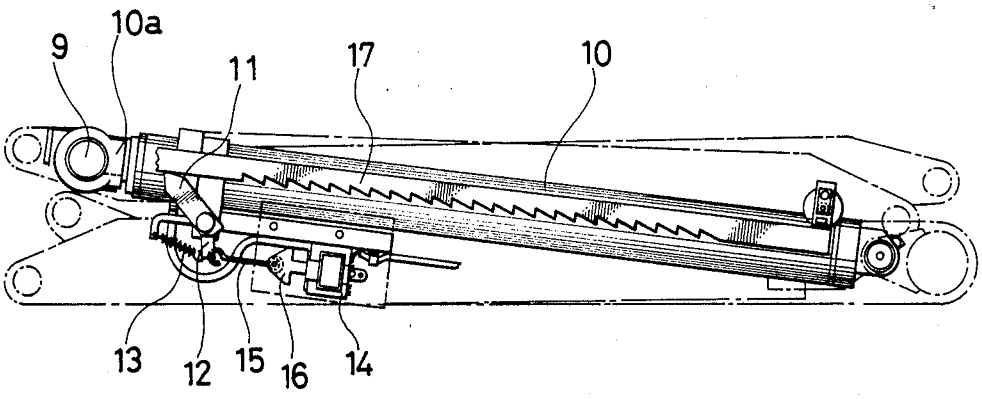
FIG. 2 is an enlarged front elevational view showing particularly a pawl and rack mechanism in the system of FIG. 1.
Figure 3:
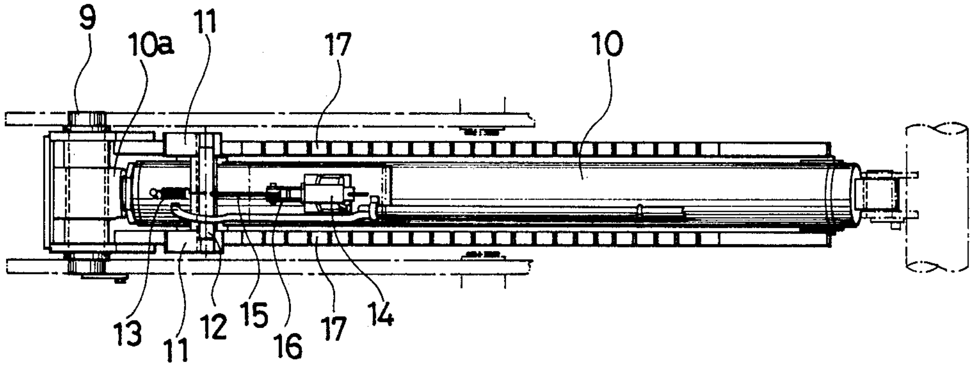
FIG. 3 is a bottom plan view of FIG. 2.

A coiled spring 13 is connected to the pawl connecting member 12 and normally holds the pawls 11 in engagement with the racks 17. A fluid pressure-operated cylinder or a solenoid can be substituted for the spring 13. A hook 15 is fastened to the connecting member 12 on the opposite side thereof from the spring 13. An AC solenoid 14 is provided on the cylinder 10 and includes a slidable member or plunger 16 connected to the hook 15, as shown in FIGS. 2 and 3.

The pawls 11 are normally held in engagement with the racks 17 by the pulling force of the spring 13. If the hydraulic cylinder 10 is actuated to raise the table 6, the racks 17 are moved upward and each pawl 11 drops from one tooth to another on the corresponding rack 17, while maintaining its engagement with the rack 17. When the table 6 has been raised, therefore, the pawls 11 cooperate with the racks 17 to hold the table 6 in its raised position. The pawls 11 can be disengaged from the racks 17 if the AC solenoid 14 is energized to rotate the pawls 11 counterclockwise as viewed in FIG. 2, by overcoming the force of the spring 13.

The two pits 1 have an appropriate distance therebetween and are parallel to each other. The two jacks are identical to each other in construction. They are connected to each other by a mechanism which enables them to operate simultaneously. It may, for example, comprise a hydraulic fluid conduit connecting the two hydraulic cylinders 10, or a mechanical device including a common shaft.

Figure 4:
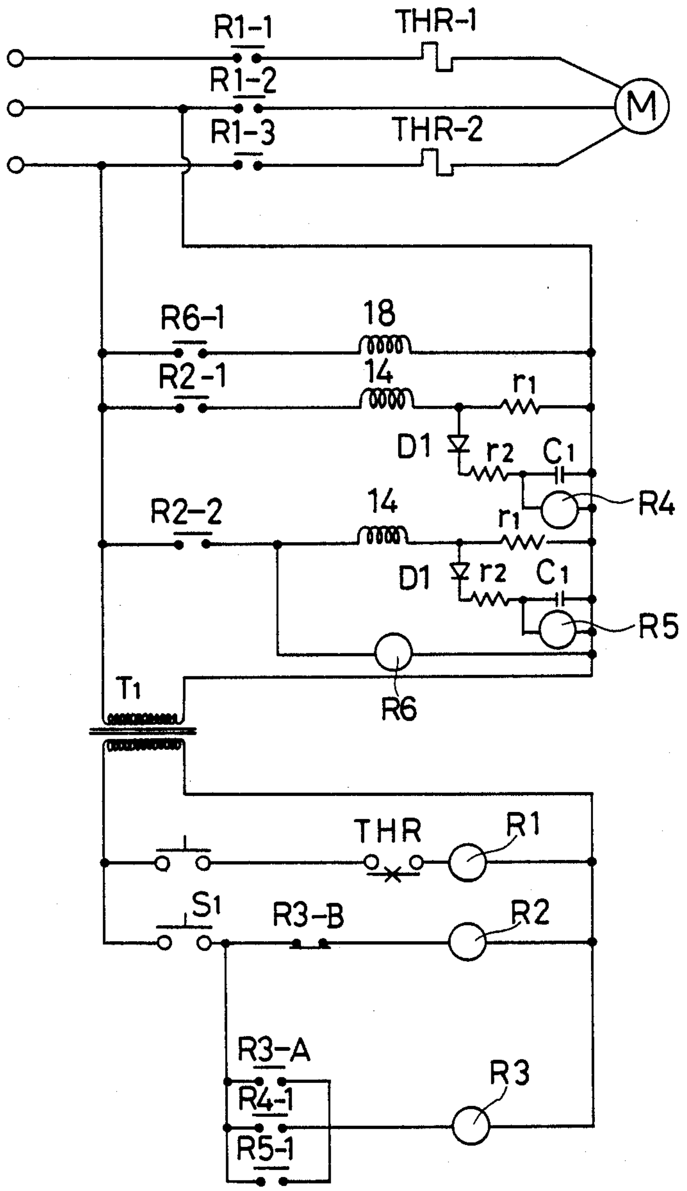
FIG. 4 is a diagram showing an electrical circuit embodying the device of this invention.

Attention is now directed to FIG. 4 showing an electrical circuit defining a safety device embodying this invention. The circuit includes an electric motor M which is driven by a power source supplying a three-phase power of 200 V and thereby drives a hydraulic pump. The motor M is controlled by a control circuit which is driven by the same power source, and by a control circuit which is supplied with a voltage of 24 V which is obtained by dropping the power source voltage of 200 V in a transformer $T_1$.

The control circuit which is driven by the voltage of 200 V includes the AC solenoid 14, a table lowering relay R2-1 having a relay coil which is energizable by an AC voltage of 24 V, and a resistor $r_1$ which provides a resistance of three ohms. The relay R2-1 and the resistor $r_1$ are connected in series to the solenoid 14. An integrating circuit is provided in parallel to the resistor $r_1$ and comprises a diode $D_1$, a resistor $r_2$ which provides a resistance of 30 ohms, and an electrolytic capacitor $C_1$ having a capacitance of 2200 μF. A pawl position detecting relay R4 is connected in parallel to the capacitor $C_1$ and has a relay coil which is energizable by a DC voltage of 6 V.

The control circuit has been described only for one of the jacks. The other jack is provided with a control circuit of the same construction, including a table lowering relay R2-2 and a pawl position detecting relay R5. No repeated description is made.

The control circuit which is driven by a voltage of 24 V includes a table lowering stop relay R3-B connected in series to a table lowering switch $S_1$ and having a relay coil which is energizable by an AC voltage of 24 V when the pawl position detecting relays R4 and R5 are set in operation. If the switch $S_1$ is turned on, the relays R2-1 and R2-2 are closed and the AC solenoids 14 are, therefore, energized. The plungers 16 are withdrawn into the solenoids 14 and thereby cause the pawls 11 to rotate counterclockwise as viewed in FIG. 2 by overcoming the force of the springs 13 and be thereby disengaged from the racks 17. A table lowering delay relay R6-1 is closed simultaneously with the closure of the relays R2-1 and 2—2 and after about one second, an AC solenoid 18 for a table lowering valve is energized, whereupon the lowering of the piston rods 10*a* is started.

If the AC solenoid 14 in one of the jacks fails to be properly actuated and the pawls 11, therefore, remain in engagement with the racks 17, an electric current of 3 A flows to the AC solenoid 14 and a voltage of 9 V appears across the opposite ends of the resistor $r_1$. This current is rectified by the diode $D_1$, and the rectified current flows through the resistor $r_2$ and is stored in the capacitor $C_1$. After about 0.4 second, the electric charge stored in the capacitor $C_1$ reaches the voltage which can energize the pawl position detecting relay R4. The relay R4 is energized and the table lowering stop relay R3-B is, therefore, set in operation. As a result, the table lowering relays R2-1 and R2-2 are opened and the lowering of the piston rods 10a is stopped. Therefore, there is no likelihood at all of only one of the tables 6 being lowered, but the vehicle can be safely supported on the two tables 6.

Thus, if the pawls 11 in either of the jacks are not disengaged from the racks 17, the piston rods 10a in both of the jacks are prevented from being retracted to lower the tables 6.

The operation of the device as hereinabove described is, however, based on the assumption that there does not exist any breakage of wiring connection or other fault preventing a proper flow of electric current to both of the AC solenoids 14. It is, however, likely that the presence of any such fault may prevent a proper flow of electric current to either of the AC solenoids 14, even if the table lowering relay R2-1 or R2-2 is set in operation. If such is the case, the device allows the lowering motion of the corresponding piston rod 10a, while the pawls 11 remain engaged with the racks 17. This is due to the inability of the device to distinguish any such situation from the situation in which a slight amount of electric current remains in the AC solenoids 14 after a proper flow of electric current has energized them to thereby disengage the pawls 11 from the racks 17.

Figure 5:
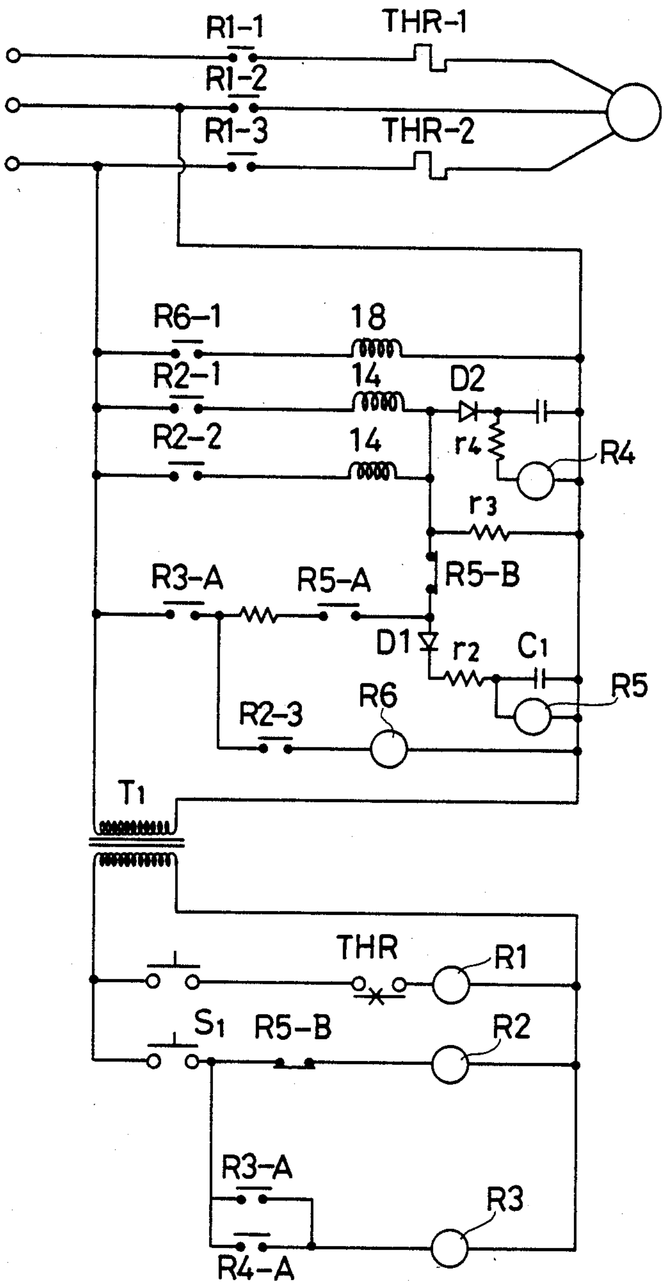
FIG. 5 is a diagram similar to FIG. 4, but showing a modified circuit.

A modified device embodying this invention is, therefore, shown in FIG. 5. It includes a resistor $r_3$ connected in series to the two solenoids 14 which are connected in parallel to each other, and a circuit connected in parallel to the resistor $r_3$ and composed of a serially connected combination of a diode $D_2$, a resistor $r_4$ and the relay R4. The relay R4 is set in operation to allow the lowering motion of the piston rod 10a only when an electric current has properly flown to both of the AC solenoids 14. If a proper electric current flows to the AC solenoids 14, they are energized to disengage the pawls 11 from the racks 17. The total amount of the electric current flowing through the AC solenoids 14 flows to the resistor $r_3$. A table lowering stop relay R3-A is closed and the AC solenoid 18 is energized, whereby the piston rods 10a are retracted to lower the tables 6. If no electric current flows to one of the AC solenoids 14 to energize it and thereby disengage the pawls 11 from the racks 17, the relay R4 is not supplied with any electric current that is required for energizing it. As a result, the relay R3-A remains open and the corresponding piston rod 10a is not retracted.

Although the invention has been described as being applied to a vehicle jacking system comprising a pair of double X-shaped jacks which are designed for simultaneous operation, it is equally applicable to a system comprising three or four jacks which are designed for simultaneous operation. It is applicable not only to double X-shaped jacks, but also to other types of jacks, such as single X-shaped ones. Moreover, it is applicable not only to a vehicle lifting system, but also to a jacking system for a cargo handling machine or any other kind of industrial machine.

The values of the resistance provided by the resistors, the capacitance of the capacitor, etc. have been stated merely by way of example. Any change can, of course, be made if the electrical circuit which the resistors, etc. form can properly detect variation in the amount of an electric current flowing to either of the AC solenoid and thereby the failure of the pawls to be disengaged from the racks.

What is claimed is:

1. In a safety device for a jacking system comprising a plurality of jacks which are designed for simultaneous operation, at least one cargo table supported on said jacks, and a mechanism connecting said jacks for their simultaneous operation, each of said jacks being provided with a fluid pressure-operated cylinder for moving said jack to raise and lower said table, and further provided with a pawl and rack mechanism which is normally held in its engaged position for holding said table in its raised position, and an AC solenoid connected to each said pawl and rack mechanism for moving it to its disengaged position to allow said table to be lowered, the improvement which comprises:

a resistor connected in series to said solenoid;

an integrating circuit connected in parallel to said resistor and including capacitor means for producing an electrical signal indicating any failure of said pawl and rack mechanism to be moved to its disengaged position; and relay means connected in parallel to said capacitor for operation in response to said signal to stop any lowering motion of each of said cylinders.

2. A device as set forth in claim 1, wherein said integrating circuit includes a diode and a resistor connected in series to said capacitor means.

3. A device as set forth in claim 2, further including a resistor connected in series to said solenoid in each of said jacks and in parallel to a serially connected combination of a diode, a resistor and said relay means.

4. A device as set forth in claim 3, wherein said jacking system comprises a pair of scissors jacks and a pair of cargo tables each supported on one of said jacks.

5. A device as set forth in claim 4, wherein said cylinder is a hydraulic cylinder.

6. A device as set forth in claim 5, wherein said system is one which is used for lifting a motor vehicle when repairing it.

7. A device as set forth in claim 1, further including a resistor connected in series to said solenoid in each of said jacks and in parallel to a serially connected combination of a diode, a resistor and said relay means.

8. A device as set forth in claim 7, wherein said jacking system comprises a pair of scissors jacks and a pair of cargo tables each supported on one of said jacks.

9. A device as set forth in claim 8, wherein said cylinder is a hydraulic cylinder.

10. A device as set forth in claim 9, wherein said system is one which is used for lifting a motor vehicle when repairing it.

11. In a platform jack of the type having a plurality of jack cylinders and a cargo table operatively raised and lowered thereby, and having a pawl and rack mechanism associated with one jack cylinder of the plurality of jack cylinders and which is normally held in its engaged position for holding said table in its raised position, and an AC solenoid connected to said pawl and rack mechanism for moving it to its disengaged position to allow said table to be lowered, the improvement which comprises:

a resistor connected in series to said solenoid;

an integrating circuit connected in parallel to said resistor and including a capacitor means for producing an electrical signal indicating any failure of said pawl and rack mechanism to be moved to its disengaged position; and a relay means connected in parallel to said capacitor for operation in response to said signal to stop any lowering motion of the plurality of jack cylinders.

* * * * *